United States Patent

Hedstrom et al.

[11] Patent Number: 5,222,411
[45] Date of Patent: Jun. 29, 1993

[54] MINIATURE CORE ADJUST DEVICE

[75] Inventors: Kristen K. Hedstrom, Romeo; Mark R. Truman, Washington, both of Mich.

[73] Assignee: Handy & Harmon Automotive Group, Auburn Hills, Mich.

[21] Appl. No.: 863,884

[22] Filed: Apr. 6, 1992

Related U.S. Application Data

[63] Continuation-in-part of Ser. No. 703,551, May 21, 1991.

[51] Int. Cl.⁵ .............................................. F16C 1/10
[52] U.S. Cl. .............................. 74/501.5 R; 74/502.6; 74/502; 403/104
[58] Field of Search ............ 74/501.5 R, 502.6, 501.6, 74/502.4, 502, 503, 586; 403/104, 105, 320, 325, 324; 192/111 A, 111 B; 248/74.1, 74.3

[56] References Cited

U.S. PATENT DOCUMENTS

| | | | |
|---|---|---|---|
| 3,093,220 | 6/1963 | Modrey | 403/104 |
| 3,572,159 | 3/1971 | Tschanz | 74/502.5 |
| 3,710,645 | 1/1973 | Bennett | 70/502.4 |
| 4,141,117 | 2/1979 | Van Gompel | 24/136 R |
| 4,177,681 | 12/1979 | Wess | 403/118 X |
| 4,294,133 | 10/1981 | Hurley | 74/502.4 |
| 4,339,212 | 7/1982 | Sauber | 403/324 |
| 4,418,583 | 12/1983 | Taig | 70/501.5 R |
| 4,585,367 | 4/1986 | Gall | 403/104 |
| 4,635,498 | 1/1987 | Zimmerman et al. | 74/502.4 |
| 4,658,668 | 4/1987 | Stocker | 74/501.5 R |
| 4,676,119 | 6/1987 | Spease | 74/501 R |
| 4,696,372 | 9/1987 | Fields | 182/92 |
| 4,699,330 | 10/1987 | Barazone | 242/86.52 |
| 4,799,400 | 1/1989 | Pickell | 74/502.6 |
| 4,833,937 | 5/1989 | Nagano | 74/502.6 X |
| 4,841,805 | 6/1989 | Italiano | 74/501.5 R |
| 4,841,806 | 6/1989 | Spease | 74/501.5 R |
| 4,850,240 | 6/1989 | White | 74/500.5 |
| 4,852,425 | 8/1989 | Stocker | 403/105 X |
| 4,854,185 | 8/1989 | Lichtenberg et al. | 74/501.5 R |
| 4,854,186 | 8/1989 | Jakob et al. | 74/501.5 R |
| 4,869,123 | 2/1990 | Stocker | 74/501.5 R |
| 4,903,541 | 2/1990 | Shiota | 74/50.5 R |
| 4,936,161 | 6/1990 | Polando | 74/502.6 |
| 4,957,017 | 9/1990 | Corbett | 74/502.4 |
| 4,958,536 | 9/1990 | Baumgarten | 74/501.5 R |
| 4,987,793 | 1/1991 | Baumgarten et al. | 74/502 |
| 5,015,023 | 5/1991 | Hall | 294/102.1 |

Primary Examiner—Carl D. Friedman
Assistant Examiner—Winnie Yip
Attorney, Agent, or Firm—Pennie & Edmonds

[57] ABSTRACT

A cable length adjustment device for adjusting a cable comprising an elongated member connected to the core of the cable, a locking member formed to prevent translatory movement of the elongated member when in a first locked position, and allow for translatory movement of the elongated member in a second unlocked position, and a housing substantially encasing the locking member.

23 Claims, 3 Drawing Sheets

MINIATURE CORE ADJUST DEVICE

CROSS REFERENCE TO RELATED APPLICATION

This a continuation-in-part of application Ser. No. 07/703,551 filed May 21, 1991.

BACKGROUND OF THE INVENTION

This invention relates to a cable length adjustment device, and more particularly to a device suitable for length adjustments of cables in any system requiring precise adjustment, such as those found in park interlock cable systems of automobiles.

In a park interlock system of an automobile, a cable is utilized to connect a translatable gearshift mechanism to an ignition key tumbler in such a fashion so as to prevent the automobile from shifting out of "park" without an ignition key in the tumbler or to prevent the removal of the ignition key without the gearshift mechanism being in "park". Due to the precise settings required in such systems, the correct cable length is essential to the proper operation of such systems.

To ensure that the cable is a proper operating length, cable length adjusters are utilized to perform fine adjustment. The cable length adjusters generally include a cable having a conduit or sheath with a longitudinally extending bore for movably receiving a cable core. An elongated member is attached at one end to the conduit of the cable and at the other end to the gearshift mechanism. A locking member is provided which is mounted on the elongated member in a manner which, when unlocked, allows for sliding movement between the elongated member and the locking member and when locked, prevents movement of the elongated member with respect to the locking member. Adjustment means are provided which allow the locking member to engage the elongated member in predetermined increments along the elongated member thereby adjusting the length of the conduit to achieve the appropriate cable length. Examples of such adjusters include U.S. Pat. Nos. 4,418,583, 3,710,645 and 3,572,159.

The conduit adjust type mechanisms described above suffer from a number of shortcomings. The most significant is the need for there to be sufficient slack in the conduit to allow the elongated member to slide freely within the adjuster. In many cases, the conduit is routed underneath carpet or is fixed in place by a location clip to avoid interference with mating components. In these instances, the conduit cannot move freely and the adjustment is biased or unattainable.

Furthermore, the locking members of the prior devices in general, have closed internal diameters. Hence, material must be added to their external circumferences to create raised surfaces for locking features to act against. In addition to not efficiently maximizing valuable space, this design requires that the threaded area of the locking member be created in a secondary tapping operation and since a thread lead cannot be achieved by conventional tapping operations, they are not possible with the closed diameter type devices. Another disadvantage of the closed internal diameter type device is that the threaded area of the locking member rides against the elongated member biasing adjustment due to partial engagement of the threads.

Additionally, the above-described cable length adjusters generally do not provide a fine adjustment means required for many purposes. Specifically, access to the locking member is limited because of the design of the adjuster, and the adjustment increments are typically too large to accommodate cable length discrepancies such as those found in park interlock systems. Further, the adjusters are constructed of a plastic material which does not meet new automobile engine design requirements of temperature and strength.

Finally, none of the prior art devices disclose a visual means whereby a user of the device can identify the locked position of the mechanism. While many of the devices provide an audible "snap" when the device is locked, this may be ineffective, particularly in a noisy factory or repair shop.

SUMMARY OF THE INVENTION

The present invention is a miniature core adjust device wherein the elongated member of the adjuster is connected to the core of the cable as opposed to the conduit of the cable as in the prior art devices. The core adjust device does not suffer from the above-mentioned problems associated with the conduit adjust type devices because the device adjusts the length of the inner member (core) which is free to slide within the conduit at all times.

According to the invention, the cable length adjustment device comprises a substantially cylindrical housing having a bore formed through its longitudinal axis. A U-shaped channel is formed through a side wall of the housing. Means is also provided for attaching the device to the appropriate part of the automobile. An elongated member is positioned in the bore of the housing so that it has translational motion with respect to the housing, but it is prevented from having rotational motion.

A locking member is provided within the channel formed in the housing for rotation thereabout and includes means for receiving and means for engaging the elongated member embodied in the form of two concentric cylinders having a bore formed therethrough to receive the elongated member and selectively allow translational motion with respect thereto. Advantageously, the cylinders are connected by a rib member (providing an open internal diameter) which, when rotated to a locking position, engages the elongated member so as to prevent translational motion of the elongated member with respect to the housing.

In a preferred embodiment, the elongated member has exterior arcuate threads having a thread lead around a first portion of its circumference which are formed to engage corresponding interior arcuate threads also having a thread lead in the rib member. The elongated member also has a second unthreaded portion having a radius smaller than the radius of the threaded portion. When the threads of the rib member are aligned with the unthreaded portion of the elongated member, the elongated member can translate relative to the housing. However, when the locking member is rotated to its locking position, the threads of the rib member and of the elongated member engage to prevent translational motion, thereby locking the elongated member to the housing. The housing is preferably made from a plastic material.

The invention also includes biasing means preferably embodied in a spring arrangement that is used to bias the elongated member into the housing. Furthermore, securing means is provided for retaining the locking member in its locked position, and is preferably embodied by employing the rib member to cooperate with a hook-like securing member formed integrally with the housing. Finally, visual means in the form of indicia are provided to identify when the locking member has been rotated into its locked position.

The advantages of the cable length adjustment device of the invention include the following. By connecting the elongated member to the core of the cable as opposed to connecting it to the conduit, adjustment is easily attainable and not biased since the inner member is free to slide within the conduit at all times. Use of the rib member to implement the locking obviates the need for adding material to the external circumference of the locking member to create a raised surface for the locking features to act against as was required with the closed internal diameter locking members. Furthermore, as opposed to a cylinder with a closed internal diameter, the threads of the rib member can be mold or cast with the rest of the locking member, i.e., no secondary tapping to create the threads is required, and a thread lead can be achieved. This design also conserves valuable space and eliminates partial thread engagement or adjustment bias. Safety is increased by providing the user with a visual indication of the locked status of the device in addition to the conventional audible indication. This is particularly useful in noisy factories and repair shops. Finally, by providing a thread lead, slack is induced into the system upon locking and no secondary shim is required as in prior devices.

DETAILED DESCRIPTION OF THE INVENTION

The present device is a modification of that disclosed in U.S. patent application Ser. No. 07/703,551 filed May 21, 1991, the content of which is expressly incorporated herein by reference thereto for additional information relating to the present invention.

Although this invention is described below in connection with a park interlock cable system, the invention is not limited to this application alone, and will perform equally well in all situations where precise cable adjustment is required such as throttle cable systems, speed control cable systems, bicycle brake cable systems or any other similar cable systems.

Figure 1:
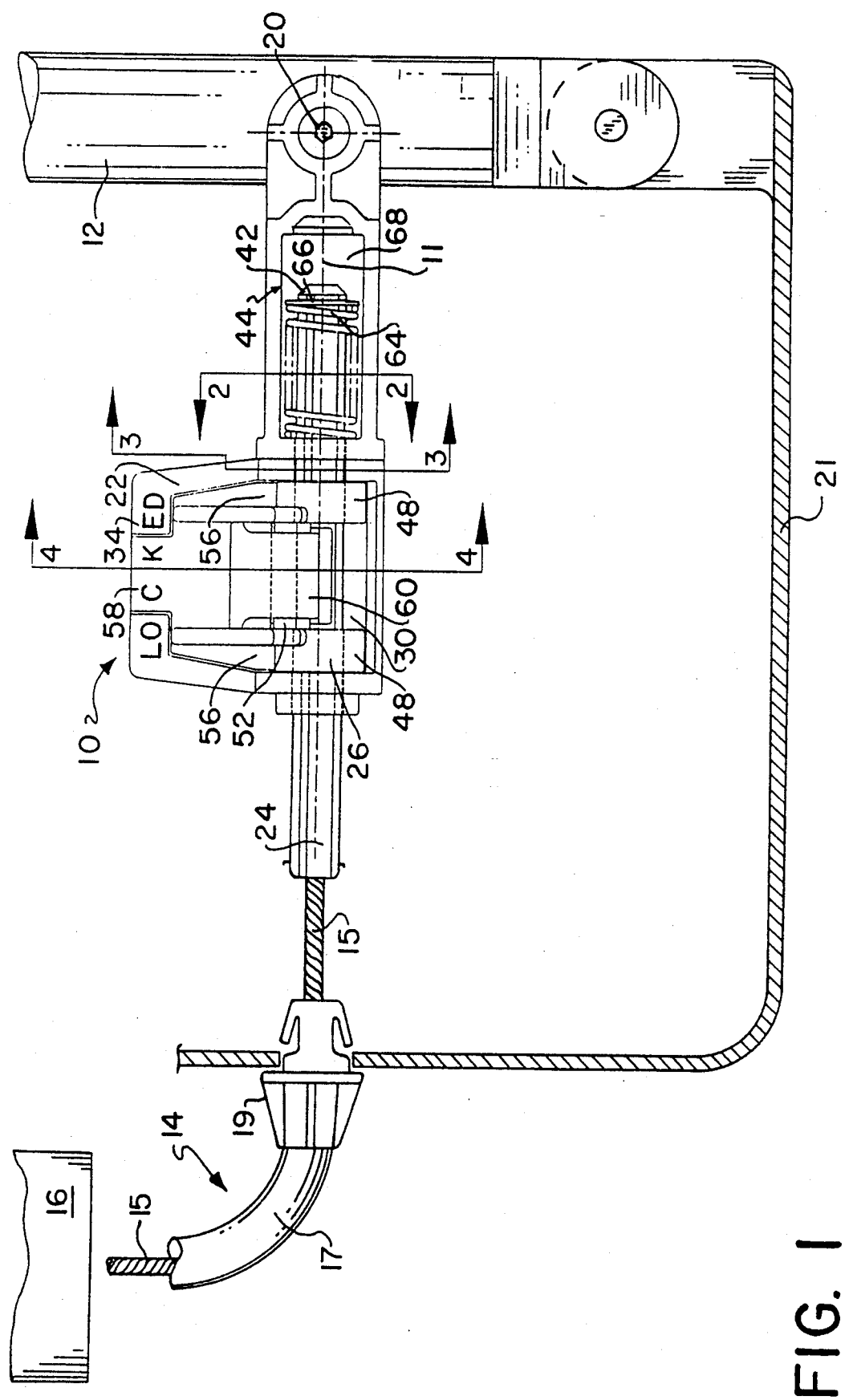
FIG. 1 is an illustration of the adjustment device of the invention connected to a transmission and gearshift.
Figure 2:
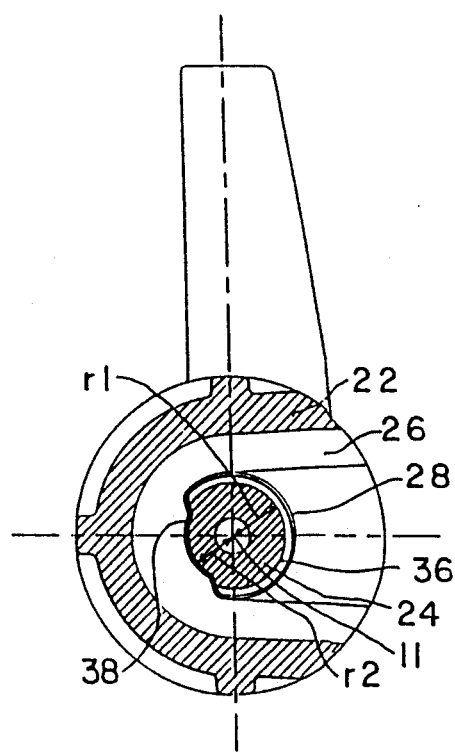
FIG. 2 is a cross-sectional view taken at 2—2 of FIG. 1 with the adjustment device in assembled state.
Figure 3:
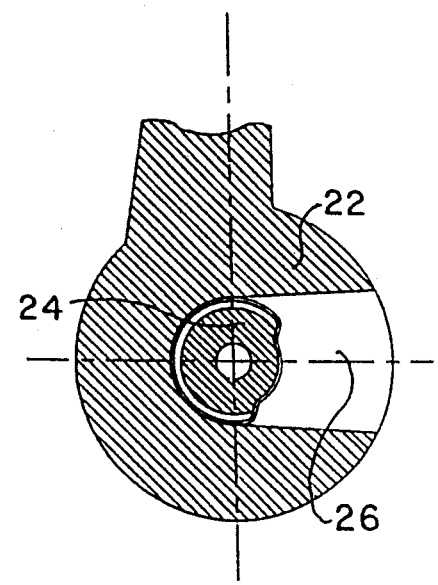
FIG. 3 is a cross-sectional view taken at 3—3 of FIG. 1 with the adjustment device in assembled state.

The cable length adjustment device, the type of which can, for example, be employed in a park interlock system, generally designated 10 in FIG. 1, is connected at one end to a gearshift 12 of the automobile and at the other end to the core 15 of cable 14. The cable 14 includes a conduit 17 having a longitudinally extending bore for movably receiving the core 15. The conduit 17 is attached to a conduit attachment 19 which has a bore for receiving and passing through core 15 and allowing relative translatory motion with respect thereto. Fixed bracket 21, at one end, is connected to and supports the conduit attachment 19 and at the other end is pivotally mounted to gearshift 12 and translates motion between the gearshift 12 and cable 14. The cable is ultimately connected to the ignition key tumbler 16 of the automobile. By means known in the art, translation of the gearshift 12 out of the "park" position is prevented without the presence of the ignition key, and removal of the ignition key without gearshift 12 being in the "park" position is similarly inhibited. The core 15 of cable 14 is crimped or molded directly to the adjustment device 10. The adjustment device is connected to the gearshift 12 via a snap-fit arrangement 20.

The adjustment device comprises a housing 22, an elongated member 24 and a locking member 26.

Referring to the figures, the housing 22 is formed of an injection molded mineral reinforced nylon material. The housing includes a central axial bore 28 having centerline 11 formed to accommodate the elongated member 24. Additionally, a U-shaped channel 30 is formed through a sidewall of said housing member for positioning of the locking member 26.

The bore 28 of the housing 22 is formed with a cross sectional profile symmetric to the cross sectional profile of the elongated member 24. The bore 28 is sized to prevent relative rotational motion of the elongated member with respect to housing 22 but to allow for axial motion of the elongated member 24. This arrangement will be discussed in more detail below in connection with the elongated member.

The elongated member 24 which is crimped or molded directly to the core 15 of cable 14, may be made as either a zinc die casting a molded mineral and/or glass reinforced nylon material, or an extruded steel profile with secondary machined features. A section of exterior arcuate threads 36 are evenly spaced around a portion of the circumference of the elongated member 24. Preferably, these threads extend from 240 degrees to 270 degrees around the circumference of the elongated member 24 and are positioned at a first radial distance r1 from the centerline 11. The threads include a lead such as a nine lead start #10-32 UNF thread to induce slack into the system upon locking. It should be noted that the pitch of the threads can be varied to add or remove varying amounts of slack during locking as required by the particular system. These individual threads are axially spaced 0.02 inches apart, thus allowing for a fine adjustment in increments of 0.02 inches. The remainder of the circumference of elongated member 24 comprises an unthreaded portion 38. The unthreaded portion 38 is positioned at a second radial distance r2 from centerline 11, where r2<r1.

Hence, when the elongated member 24 is placed in the housing 22, which as previously discussed has bore 28 having a cross sectional profile symmetric to that of the elongated member, the differential of the two radii act to restrict relative rotational motion of the elongated member with respect to the housing. The elongated member also has a chamfered portion 42 at its forward end portion 44 which fits within a recessed area 43 contained in the housing 22 which is formed to fit the chamfered portion 42. The forward end portion 44 also includes a circumferentially formed groove 46 provided for housing a spring retaining clip. These features will be described in more detail below.

As noted above, one method of manufacturing the elongated member is to machine a continuous circular threaded section on the steel rod and then machine the threads, bore, groove, chamfer and unthreaded section. Additionally, the forward end portion 44 can then be turned on a lathe to produce the chamfered portion 42 and the groove 46.

The locking member 26 may be formed of the same materials recited above for elongated member 24. The locking member has the properties of heat resistance and strength required of modern automobile parts. The locking member 26 is mounted in the U-shaped channel 30 of the housing 22 such that it can rotate between a first locked position and a second unlocked position.

The locking member is made up of two concentric cylinders 48 having a bore 50 formed through their longitudinal axes to allow for positioning of the elongated member 24 within the locking member. The bore 50 has a radius r3 (FIG. 5) slightly greater than the radius of the threaded portion r1 of the elongated member. As a result, the locking member does not inhibit relative rotational movement of the elongated member. The two cylinders 48 are connected by a rib member 52. The rib member 52 has a circumferentially positioned interior thread portion 54. Again, these threads preferably include a thread lead. The threads 54 of the rib member 52 are formed to engage the threads 36 on the elongated member 24 when the locking member is rotated to its locked position (FIG. 4), thus preventing relative translational motion between the locking member and the elongated member. Since the threads include a thread lead, slack is induced into the system during the locking motion providing a clearance between the mating components.

Figure 5:
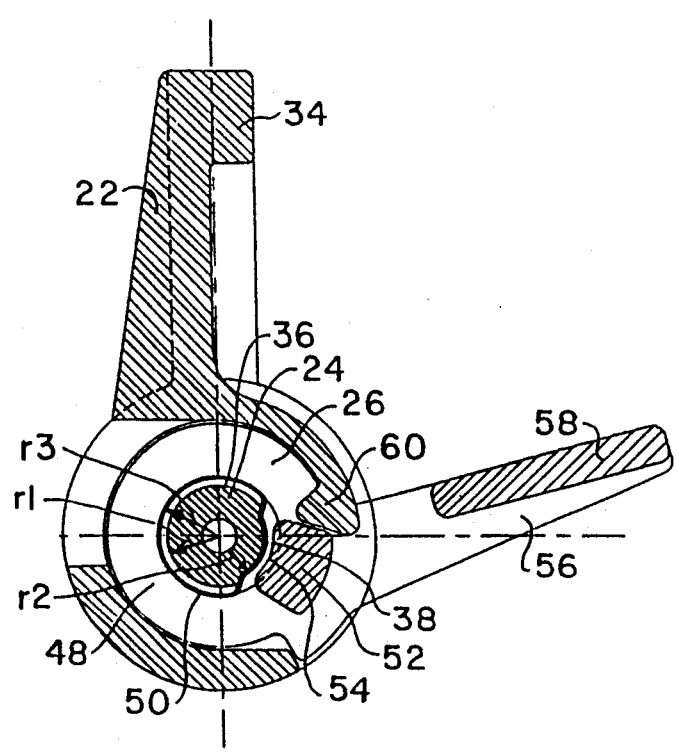
FIG. 5 is a cross-sectional view similar to FIG. 4 with the locking member in an unlocked position.

As shown in FIG. 5, when the locking member is in its unlocked position, the threads 54 of the rib member 52 are aligned in spaced relation to the unthreaded portion 38 of the elongated member 24. Due to the reduced radius r2 of the unthreaded position 38 compared to the radius r1 of the threaded portion 36, there is sufficient clearance between the unthreaded portion 38 of the elongated member 24 and the threads 54 of the rib member 52 to allow for relative translational motion.

As illustrated by the figures, the shape of the locking member 26 comprises a raised surface 56 formed on the external diameters of the cylinders 48. This raised surface provides a positive stop against the housing 22 when the locking member 26 is rotated into its locked position. Additional material spans the cylinders 48 to form a first thumb tab 58. This provides an installer with a greater surface with which to promote rotative movement of the locking member 26 with respect to the elongated member 24.

The rib member 52 of the locking member 26 cooperates with a hook-like securing member 60 formed integrally with the housing 22 to secure the locking mechanism in a fully rotated locked position. The rib member 52 meets the hook-like securing member 60 in a snap-fit arrangement (FIG. 4) to ensure that the locking member will remain in a locked position. Since the rib member 52 is used to create the locking surface, no additional material need be formed on the locking member 26 for this purpose. Additionally, the "snap" signals the installer that the device is locked. Furthermore, as shown in FIG. 1, in the preferred embodiment visual means is provided to inform the installer that the device is locked. This is accomplished by placing indicia on the first thumb tab 58 and on a second thumb tab 34 which is formed along the edge of the U-shaped channel 30 of the housing 22. Preferably, the letters "LO—ED" are placed on the second thumb tab 34 and the letters "CK" are placed on the first thumb tab 58. Hence, when the locking member is rotated into its locked position, the letters are aligned to spell out the word "LOCKED". Such visual indication of the locked status of the device can be valuable particularly in loud factories or repair shops. Additionally, the hook-like securing member 60 of the housing also abuts rib member 52 when the locking member is in an unlocked position (FIG. 5), thereby preventing relative rotation between the locking member and the housing. This feature is especially useful during shipping for it ensures that the device will not inadvertently lock.

By using a locking member that employs a rib member 52, as opposed to a cylinder with a closed internal diameter to implement the locking and unlocking of the device, several advantages are gained. First, by opening the internal diameter of the locking collar, access is allowed for a mold structure. This enables the threads of the rib to be mold or cast with the rest of the locking member, as opposed to a secondary tapping operation to create the threads, and a thread lead can be formed. Furthermore, since the elongated member and the threaded area 54 of the rib member 52 are both supported by the housing 22, the threads 54 of the rib member 52 are prevented from riding against the elongated member and potentially biasing the adjustment. Additionally, since the threads 54 are incorporated into the rib member 52 of the locking member 22, a reduced package size is possible as compared to previously existing mechanisms.

Figure 6:
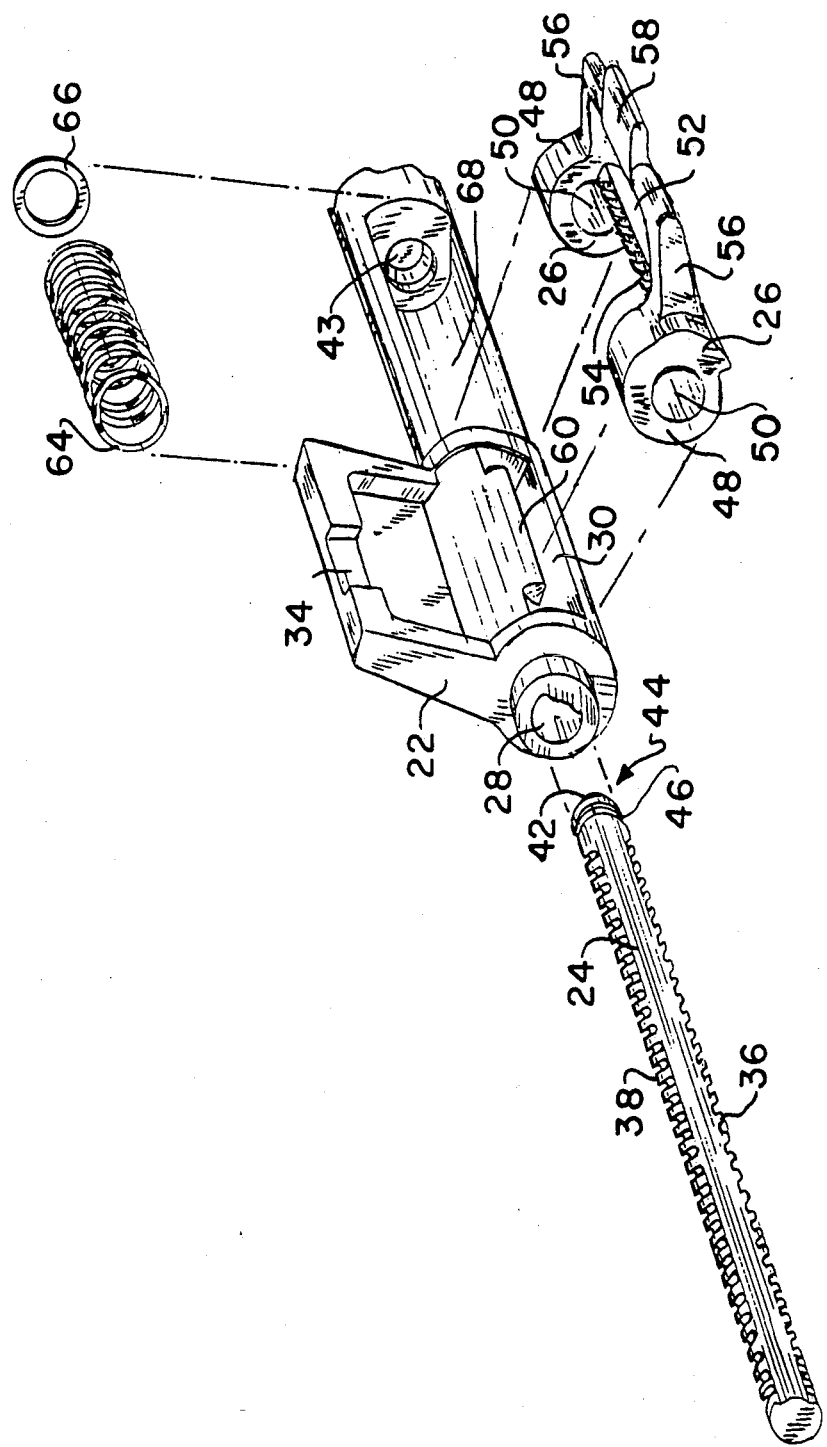
FIG. 6 is an exploded view of the adjustment device of the invention.

Means for biasing the elongated member 24 is used to assure that, upon installation, the cable 14 is tensioned to achieve a line to line fit of the components within the system. In the preferred embodiment, the biasing means is realized by fitting a simple compression spring 64 (FIGS. 1 and 6) over the forward end portion 44 of elongated member 24. The spring 64 is held in place at one end by a flexible circular clip 66. The clip 66 is designed to be forced over elongated member 24 and fit into groove 46. Thus, the internal diameter of clip 66 is equivalent to the diameter of the grove 46. Furthermore, the outside diameter of clip 66 is equivalent to the outside diameter of the spring 64 thereby retaining the spring. The spring is held in place at the other end by the wall of a second U-shaped channel 68 formed in the side wall of the housing member 22. This second channel 68 houses the spring 64 and clip 66 such that they are in axial alignment with the bore 28 of the housing 22.

The spring 64 and clip 66 are preferably manufactured from high carbon spring steel and heat treated to the appropriate strength and hardness.

Figure 4:
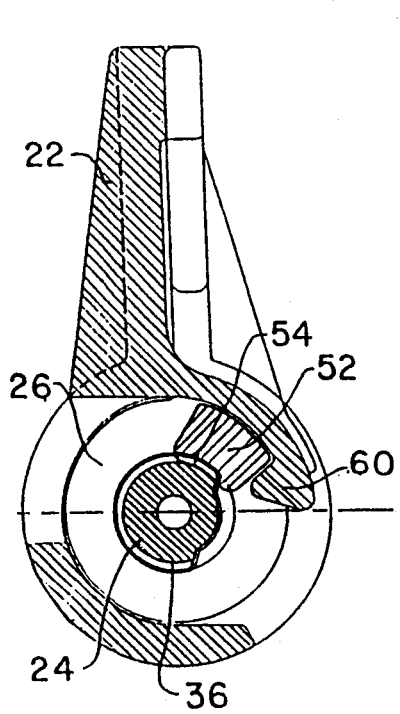
FIG. 4 is a cross-sectional view taken at 4—4 of FIG. 1 with the locking member in a locked position.

FIGS. 4 and 5 show the relative rotational positions of the locking member 26 with respect to the elongated member 24. In an unlocked position of the locking member, as illustrated in FIG. 5, the unthreaded portion 38 of the elongated member 24 aligns with the rib member 52 of the locking member 26 leaving a clearance between the threads 54 of the rib member 52 and the unthreaded portion 38 of the elongated member 24. Thus, relative translational motion can be performed between the two members. However, when the locking member 26 is rotated to its locking position, as illustrated in FIG. 4, the exterior threaded portion 36 of the elongated member 24 engage the interior threads 54 of the rib member 52. In this case, translational motion is prevented between the two members and the device is locked.

During assembly of the cable adjustment device, locking member 26 is inserted into the U-shaped channel 30 of housing 22 in its unlocked position. The longitudinal bores 50 of the locking member are axially aligned with the central axial bore 28 of the housing. The spring 64 and the clip 66 are then placed into the second U-shaped channel 68 of the housing 22 also in axial alignment with the central axial bore 28 of the housing. The elongated member 24 is inserted into the housing and locking member combination and is run through the spring 64 and clip 66 until the clip 66 is seated in groove 46. As previously noted, relative rotational movement of the elongated member 24 with respect to the housing 22 is prevented by the symmetrical design of the housing bore 28 with respect to the elongated member 24.

In operation, the device 10 is attached at its ends to the core 15 of cable 14 and gearshift 12. In the event that the cable contains slack, the elongated member is translated axially inwardly of the housing in increments of 0.02 inches. When the cable is properly tightened, the locking member is rotated to its locked position to lock the elongated member to the housing. Specifically, arcuate threads 36 positioned on a portion of the circumference of the exterior surface of elongated member 24 engage the arcuate threads 54 positioned on the interior surface of the rib member 52 of the locking member 26. Thus, the elongated member is prevented from translational motion with respect to the housing and the chosen length of the is maintained. Slack is also induced into the system upon locking due to the thread lead and provides clearance for the mating components. In the event that the cable is no longer maintained in a taught arrangement, the locking member is rotated to its unlocked position to align the threads 54 of rib member 52 with the unthreaded portion 38 of the elongated member 24. Thus, the elongated member is once again free to translate with respect to the housing. The cable can now be tightened again by the same process as described above.

What is claimed is:

1. A cable length adjustment device comprising:
   an elongated member having first and second ends, a first exterior portion which is threaded and a second exterior portion which is unthreaded circumferentially spacing apart from the first exterior portion;
   a housing member having a longitudinally extending bore for receiving and containing said first end of said elongated member for axial translatory movement therein;
   a locking member rotatably mounted within said housing for circumferential rotation about said elongated member between a first locked position and a second unlocked position, said locking member comprising external means formed on the circumference thereof for engaging the first exterior portion of the elongated member when said locking member is in said first position to prevent axial translatory movement of the elongated member relative thereto, said engaging means aligned in spaced relation from the second exterior portion of the elongated member when said locking means is in said second position to permit axial translatory movement of the elongated member relative thereto to allow axial adjustment of the elongated member.

2. The cable length adjustment device of claim 1 wherein said elongated member is adapted to be connected to the core of a cable.

3. The cable length adjustment device of claim 1, wherein said engaging means of said locking member further comprises first and second means for receiving said elongated member, said first and second receiving means being spaced apart sufficiently to accommodate said external engaging means therebetween.

4. The cable length adjustment device of claim 1 further comprising means for biasing the elongated member into the housing to assist in the adjustment of the axial position of the elongated member therein.

5. A cable length adjustment device comprising:
   an elongated member having first and second ends, a first exterior portion which is threaded and a second exterior portion which is unthreaded;
   a housing member having a longitudinally extending bore for receiving and containing said first end of said elongated member for axial translatory movement therein;
   a locking member rotatably mounted within said housing for circumferential rotation about said elongated member between a first locked position and a second unlocked position, said locking member comprising means for engaging the first exterior portion of the elongated member when said locking member is in said first position to prevent axial translatory movement of the elongated member relative thereto, said engaging means aligned in spaced relation from the second exterior portion of the elongated member when said locking member is in said second position to permit axial translatory movement of the elongated member relative thereto to allow axial adjustment of the elongated member, wherein said engaging means of said locking member further comprises first and second means for receiving said elongated member, said first and second receiving means being spaced apart sufficiently to accommodate said external engaging means therebetween, wherein said first and second receiving means each has a first generally cylindrical portion with an open longitudinal bore therein which allows axial translatory movement of said elongated ember therein, and a raised surface on the external diameter of the cylindrical portion formed to provide a positive stop against the housing member when the locking member is in the first position.

6. A cable length adjustment device comprising:
   an elongated member having first and second ends, an exterior threaded portion formed around a portion of the circumference of said elongated member having a first cross sectional radius, and an unthreaded portion formed around the remainder to the circumference of said elongated member having a second cross sectional radius;
   a housing member having a longitudinally extending bore for receiving and containing said first end of said elongated member for axial translatory movement therein; and
   a locking member rotatably mounted within said housing for circumferential rotation about said elongated member between a first locked position and a second unlocked position, said locking member comprising:

means for receiving said elongated member and allowing selective translatory movement therein, and external means for engaging said exterior threaded portion of said elongated member when said locking device is in said first position to prevent axial translatory movement of the elongated member relative thereto, and to align in spaced rotation to the unthreaded portion of the elongated member when the locking member is in said second position to permit axial translatory movement of the elongated member relative thereto to allow axial adjustment of the elongated member, wherein said external engaging means are formed on a circumference of said locking member adjacent said receiving means.

7. The cable length adjustment device of claim 6 wherein said elongated member is adapted to be connected to the core of a cable.

8. The cable length adjustment device of claim 6 further comprising means for biasing said elongated member into the housing to assist in the adjustment of the axial position of the elongated member therein.

9. The cable length adjustment device of claim 8 wherein said means for biasing comprises a spring fitted over the circumference of the first end of said elongated member and retained on one side by a flexible circular clip fitted into a circumferential groove formed near said first end of said elongated member and retained on an opposite side by said housing.

10. The cable length adjustment device of claim 9 wherein said housing member further comprises a second U-shaped channel formed through the side wall of said housing member for positioning said spring and said clip therein in axial alignment with said longitudinally extending bore of said housing member.

11. The cable length adjustment device of claim 6 wherein said first end of said elongated member is chamfered; and said housing member contains a recessed area formed to fit said chamfered end of said elongated member.

12. The cable length adjustment device of claim 6 wherein said means for engaging said exterior threaded portion of said elongated member and said exterior threaded portions of said elongated member include threads which are angled to induce cable slack during rotation of said locking member into said first position.

13. The cable length adjustment device of claim 6 wherein said first cross sectional radius is greater than said second cross sectional radius.

14. A cable length adjustment device comprising:
an elongated member having first and second ends an exterior threaded portion formed around a portion of the circumference of said elongated member having a first cross sectional radius, and an unthreaded portion formed around the remainder of the circumference of said elongated member having a second cross sectional radius;
a housing member having a longitudinally extending bore for receiving and containing said first end of said elongated member of axial translatory movement therein; and
a locking member rotatably mounted within said housing for circumferential rotation about said elongated member between a first locked position and a second unlocked position, said locking member comprising:

means for receiving said elongated member and allowing selective translatory movement therein; and means for engaging said exterior threaded portion of said elongated member when said locking device is in said first position to prevent axial translatory movement of the elongated member relative thereto, and to align in spaced rotation to the unthreaded portion of the elongated member when the locking member is in said second position to permit axial translatory movement of the elongated member relative thereto to allow axial adjustment of the elongated member, wherein said elongated member is adapted to be connected to the core of a cable and wherein said receiving means is two concentric cylinders having a longitudinally extending bore therethrough and wherein said cylinders are connected by a rib member, said engaging means formed on the circumference of the rib member.

15. The cable length adjustment device of claim 14 wherein said housing member further comprises a U-shaped channel formed in a side wall of said housing member for positioning said locking member therein and wherein said engaging means includes said rib member, said rib member having an interior threaded portion formed to engage said exterior threaded portion of said elongated member.

16. The cable length adjustment device of claim 15 wherein said housing member further comprises securing means extending into said U-shaped channel and being formed to mate with said rib member to maintain said locking member in a snap-fit arrangement in said first locked position.

17. The cable length adjustment device of claim 15 wherein said locking member is positioned in said U-shaped channel and said elongated member through said longitudinally extending bore of said housing member and said longitudinally extending bores of said concentric cylinders of said locking member.

18. The cable length adjustment device of claim 14 wherein each of the cylinders has raised surfaces formed on an external diameter thereof to provide a positive stop against the housing member when the locking member is in said first locked position.

19. The cable length adjustment device of claim 18 wherein said locking member further comprises a first thumb tab to provide a greater surface area with which to promote movement of said locking member with respect to said elongated member.

20. The cable length adjustment device of claim 19 wherein said housing member further comprises a second thumb tab formed along the edge of the U-shaped channel of the housing.

21. The cable length adjustment device of claim 20 wherein said first and second thumb tabs contain indicia to provide a visual indication of the position of said locking member.

22. A cable length adjustment device comprising:
an elongated member adapted to be connected to the core of a cable, said elongated member having first and second ends, an exterior threaded portion formed around a portion of the circumference of the elongated member having a first cross sectional radius and an unthreaded portion formed around the remainder of the circumference of said elongated member having a second cross sectional radius less than said first radius;

a housing member having a longitudinally extending bore for receiving and containing said first end of said elongated member for axial translatory movement therein, and a channel formed in a side wall thereof;

means for biasing said elongated member into the housing to assist in the adjustment of the axial position of the elongated member therein, said biasing means including a spring engaging said first end of the elongated member and said housing; and a locking member rotatably mounted within said housing and positioned in said housing channel for circumferential rotation about said elongated member between a first locked position and a second unlocked position, said locking member comprising:

external means for engaging the exterior threaded portion of the elongated member when said locking member is in said first position to prevent axial translatory movement of the elongated member relative thereto, said engaging means aligned in spaced relation from the second exterior portion of the elongated member when said locking means is in said second position to permit axial translatory movement of the elongated member relative thereto to allow axial adjustment of the elongated means; said locking member including first and second means for receiving said elongated member, said first and second receiving means being spaced apart sufficiently to accommodate said engaging means therebetween and each having a first generally cylindrical portion with an open longitudinal bore therein which allows axial translatory movement of said elongated member therein, and a raised surface on the external diameter of the cylindrical portion formed to provide a positive stop against the housing member when the locking member is in the first position, said means for engaging the exterior threaded portion of the elongated member formed on a circumference of said locking member intermediate said first and second receiving means.

23. The cable length adjustment device of claim 22 wherein said first end of said elongated member is chamfered; and said housing member contains a recessed area formed to fit said chamfered end of said elongated member, said engaging means and said second exterior portion of the elongated member include threads which are angled to further adjust the position of the elongated member during rotation of the locking member into the first position; and further comprising indicia to provide a visual indication of the position of said locking member.

* * * * *